June 3, 1930.  W. BLASKEWITZ  1,760,868
HANDLE
Filed Aug. 3, 1925
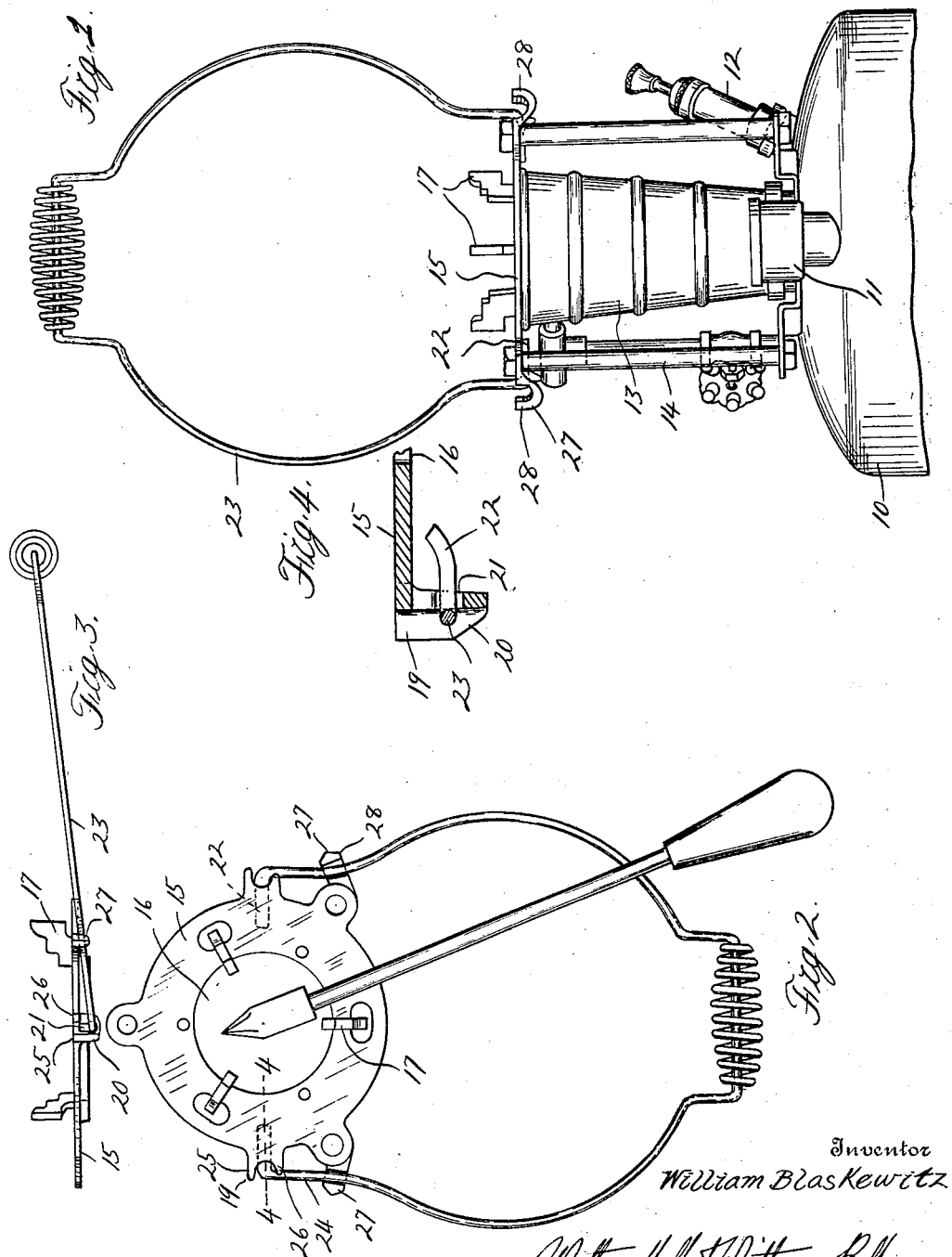
Inventor
William Blaskewitz
By Whittemore Hulbert Whittemore & Belknap
Attorneys Patented June 3, 1930

1,760,868

UNITED STATES PATENT OFFICE

WILLIAM BLASKEWITZ, OF DETROIT, MICHIGAN, ASSIGNOR, BY MESNE ASSIGNMENTS, TO CLAYTON AND LAMBERT MANUFACTURING COMPANY, OF DETROIT, MICHIGAN, A CORPORATION OF DELAWARE

HANDLE

Application filed August 3, 1925. Serial No. 47,938.

The invention relates to fire pots and refers more particularly to fire pot constructions such as are adapted for plumbers' use or where other uses of devices of this character are desired.

An object of the invention is to provide a novel handle construction which is also adapted for use in supporting the soldering irons or the like while being heated.

With these and other objects in view, the invention resides in the novel features of construction and combination and arrangements of parts as more fully hereinafter described and claimed.

Referring to the drawings in which like reference characters indicate like parts:—

Figure 1 is an elevation view of a fire pot showing the handle in vertical position;

Figure 2 is a plan view of the top plate showing the handle in its horizontal position;

Figure 3 is a side elevation view of the top plate shown in Figure 2; and

Figure 4 is a detailed sectional view through 4—4 of Figure 2.

In the drawings:

Figure 1 represents in general a fire pot of the usual or other preferred construction in which reference character 10 indicates a fuel tank, 11 the filler, 12 the pump and 13 the burner shield within which is located the burner (not shown). 14 represents the supporting standards fixed at their lower ends with respect to the tank.

Mounting the standards 14 at their upper ends is a top plate 15 which, as shown, may be formed with the central opening 16 permitting passage of the flame from the burner for heating the usual soldering irons or other tools. Bordering the opening 16 are a series of circumferentially arranged supporting members 17 preferably integral with the top plate, these members being adapted for supporting engagement with the usual melting pot (not shown).

Preferably at diametrically opposite sides of the top plate is a pair of lugs formed with the substantially U-shaped projecting portion 19 and the depending portion 20, the latter portion having an opening 21 for receiving the inturned ends 22 of the handle 23, thus forming pivot points for the handle. The portions 24 of this handle are preferably extended at right angles with the ends 22 for engagement between the legs 25 and 26 of the U-shaped portions 19. The leg 26 is preferably cammed or rounded at its end and somewhat shorter than the leg 25.

27 are handle supporting members preferably integral with the top plate and located in advance of the lugs 19, these members being formed with hooked portions 28 for receiving the handle when it is swung from the position shown in Figure 1 to that shown in Figures 2 and 3.

In operation, with the handle as shown in Figure 1 the fire pot may be carried about, the legs 25 and 26 serving to prevent accidental displacement of the handle. Furthermore, the handle ends have sufficient resilience to normally prevent a spreading action of the handle ends.

When it is desired to support a soldering iron or other tool for heating the same the handle is given an abnormal movement about the pivot points 21 in the direction of the handle supporting members 27. Such a movement causes the handle portions 24 to engage the rounded ends of the legs 26 causing outward spreading of the handle ends, the resilience of the handle permitting such spreading. Thus the handle is snapped past the legs 26 and moved into supporting engagement with the hooked portions 28. In this latter position the handle serves to support the soldering irons or other tools as indicated by the dotted line 29 in Figure 3.

A reverse movement of the handle will cause the same to snap past the legs 26 into the position shown in Figure 1 where the resilience of the handle will normally prevent its displacement. The longer leg 25 will prevent accidental movement of the handle in the opposite direction as will be readily understood.

While it is believed that from the foregoing description, the nature and advantage of my invention will be readily understood, I desire to have it understood that I do not limit myself to what is herein shown and described and that such changes may be resorted to when desired as fall within the scope of the claims.

What I claim as my invention is:

1. In a fire pot having a fuel tank, a burner, a handle pivotally connected with the fire pot and normally positioned vertically for carrying the same, lugs for utilizing the inherent resilience of the handle for maintaining the same in its carrying position, said lugs acting upon an abnormal movement of the handle about its pivot to permit positioning of the handle at an angle with the vertical for supporting a soldering iron or the like and to maintain the handle in the iron supporting position, and means engageable with the handle in the latter position for supporting the same.

2. In a fire pot having a fuel tank, a burner, a handle pivotally connected with the fire pot and normally positioned vertically for carrying the same, lugs for utilizing the inherent resilience of the handle for maintaining the same in its carrying position, said lugs acting upon an abnormal movement of the handle about its pivot to permit positioning of the handle in a substantially horizontal position for supporting a soldering iron or the like and to maintain the handle in its horizontal position, and means engageable with the handle in its horizontal position for supporting it.

In testimony whereof I affix my signature.

WILLIAM BLASKEWITZ.